US008645604B2

(12) United States Patent
Fino (10) Patent No.: US 8,645,604 B2
(45) Date of Patent: Feb. 4, 2014

(54) DEVICE ORIENTATION BASED DOCKING FUNCTIONS

(75) Inventor: Jorge S. Fino, Cupertino, CA (US)

(73) Assignee: Apple Inc., Cupertino, CA (US)

(*) Notice: Subject to any disclaimer, the term of this patent is extended or adjusted under 35 U.S.C. 154(b) by 285 days.

(21) Appl. No.: 13/072,577

(22) Filed: Mar. 25, 2011

(65) Prior Publication Data

US 2012/0246374 A1  Sep. 27, 2012

(51) Int. Cl.
*G06F 13/00* (2006.01)
(52) U.S. Cl.
USPC .......................................... 710/304; 710/303
(58) Field of Classification Search
USPC .................................................. 710/303, 304
See application file for complete search history.

(56) References Cited

U.S. PATENT DOCUMENTS

| | | | | |
|---|---|---|---|---|
| 6,060,901 | A * | 5/2000 | Davis | 326/37 |
| 6,587,694 | B1 * | 7/2003 | Mooney et al. | 455/502 |
| 7,652,589 | B2 * | 1/2010 | Autor | 340/815.45 |
| 7,708,240 | B2 | 5/2010 | Homer et al. | |
| 7,835,809 | B2 * | 11/2010 | Griffin, Jr. | 700/94 |
| 8,006,020 | B2 * | 8/2011 | Minoo | 710/303 |
| 8,464,337 | B2 * | 6/2013 | Mathew et al. | 726/17 |
| 2006/0003806 | A1 * | 1/2006 | Weber et al. | 455/561 |
| 2006/0159158 | A1 | 7/2006 | Moore et al. | |
| 2007/0004451 | A1 * | 1/2007 | C. Anderson | 455/556.1 |
| 2007/0123249 | A1 * | 5/2007 | Sun | 455/423 |
| 2008/0062134 | A1 * | 3/2008 | Duarte et al. | 345/169 |
| 2008/0108340 | A1 * | 5/2008 | Karstens | 455/418 |
| 2008/0165066 | A1 | 7/2008 | Tiscareno et al. | |
| 2008/0263252 | A1 * | 10/2008 | Habuto et al. | 710/303 |
| 2008/0278899 | A1 * | 11/2008 | Hotelling et al. | 361/683 |
| 2008/0307144 | A1 * | 12/2008 | Minoo | 710/304 |
| 2009/0023475 | A1 | 1/2009 | Chang et al. | |
| 2009/0049554 | A1 | 2/2009 | Vuong et al. | |
| 2009/0053997 | A1 * | 2/2009 | Jobling et al. | 455/41.2 |
| 2009/0296677 | A1 * | 12/2009 | Mahany et al. | 370/338 |
| 2010/0081377 | A1 | 4/2010 | Chatterjee et al. | |
| 2010/0088532 | A1 * | 4/2010 | Pollock et al. | 713/324 |
| 2010/0131691 | A1 * | 5/2010 | Chatterjee et al. | 710/303 |
| 2010/0164479 | A1 * | 7/2010 | Alameh et al. | 324/115 |
| 2010/0167783 | A1 * | 7/2010 | Alameh et al. | 455/556.1 |
| 2010/0177476 | A1 | 7/2010 | Hotelling et al. | |
| 2010/0178873 | A1 * | 7/2010 | Lee et al. | 455/41.3 |
| 2011/0195782 | A1 * | 8/2011 | Mao et al. | 463/37 |
| 2012/0030393 | A1 * | 2/2012 | Ganesh et al. | 710/303 |
| 2012/0206332 | A1 * | 8/2012 | Yonemoto | 345/156 |

FOREIGN PATENT DOCUMENTS

| | | | | |
|---|---|---|---|---|
| DE | 4305857 C1 * | 8/1994 | | A45C 5/12 |
| EP | 1244001 A2 * | 9/2002 | | G06F 1/16 |
| JP | 2004062595 A * | 2/2004 | | G06F 1/16 |
| JP | 2012151715 A * | 8/2012 | | H04N 5/225 |

OTHER PUBLICATIONS

"NN9508155: Dual-Orientation Docking Platform for Notebook Computer", Aug. 1, 1995, IBM, IBM Technical Disclosure Bulletin, vol. 38, Iss. 8, pp. 155-156.*

* cited by examiner

*Primary Examiner* — Faisal M Zaman
(74) *Attorney, Agent, or Firm* — Park, Vaughan, Fleming & Dowler LLP (57) ABSTRACT

Systems and method are provided for selecting one or more docking functions based on a physical orientation of a user device coupled to a docking device. The docking device may include a surface upon which the user device may be placed. Docking functions such as charging, data transfer, data synchronization, diagnostic checking, or other functions may be selected, performed, or both, based on the physical orientation of the user device on the surface.

20 Claims, 7 Drawing Sheets

DEVICE ORIENTATION BASED DOCKING FUNCTIONS

The present disclosure is directed towards device orientation based docking. More particularly, the present disclosure is directed, in some embodiments, towards providing docking functions based on a physical orientation of a docked user device.

BACKGROUND

A user device such as a smart phone, digital camera, or personal media player may be docked to a docking device, which may allow for charging and data transmittal. Some docking devices may provide induction charging to charge a user device, when the user device is placed on a charging surface. The user device may include circuitry which may respond to a magnetic field provided by the charging surface. Data may be transmitted between a user device and a docking device, or a host device, when the user device is docked.

SUMMARY

This disclosure relates to systems and methods for docking a user device. A surface may be provided, upon which a user device may be placed. A determination may be made, by the user device, a docking device, or other processing equipment, as to whether the user device has been placed on the surface. Based on this determination, a docking function may be selected from more than one docking function based on the physical orientation of the user device on the surface.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

The present disclosure is directed towards methods and systems for selecting one or more docking functions from a plurality of docking functions based on a physical orientation of a user device. A user device may be coupled ("docked") to a docking device. A docking device may include a surface upon which a user device may be placed (e.g., docked). In some embodiments, the surface may be configured to inductively charge the user device when the user device is placed on the surface. A docking device may include, for example, processing equipment, input/output (I/O) interfaces, memory, a power supply, any other suitable components, or any combination thereof. A docking device may be configured to charge a user device, act as a conduit in the transfer of data between the user device and a host device, synchronize data with the user device, transfer data with the user device (e.g., upload, download), run diagnostics for the user device, synchronize data between more than user devices, perform any other suitable docking function for a user device placed on the surface, or any combination thereof. One or more docking functions may be selected, performed, or both, by the docking device depending on a physical orientation of the user device on the surface.

In some embodiments, a physical orientation of a user device placed on a surface of a docking device may be determined. The physical orientation may include a translational position (e.g., Cartesian coordinates, polar coordinates), rotational position (e.g., an angle value about a suitable axis), a facing direction (e.g., face-up, face-down), any other suitable physical orientation relative to any suitable reference, or any combination thereof. For example, a physical orientation may be a position of a user device on a surface of a docking device. In a further example, a physical orientation may be a position of a user device in a particular region of a surface of a docking device. In a further example, a physical orientation may be a direction normal to a display screen of a user device on a surface of a docking device. In a further example, a physical orientation may be a relative rotational position of a first user device relative to a second user device, both arranged on a surface of a docking device. Any suitable physical orientation, relative to any suitable reference, may be used in accordance with the present disclosure.

In some embodiments, processing equipment of a user device, docking device, or both, may select a suitable docking function based on a physical orientation of the user device on a surface of the docking device. In some embodiments, a user device, docking device, or both, may include one or more sensors for determining a physical orientation of the user device. For example, a user device may include one or more accelerometers (e.g., a three-axis arrangement of accelerometers) which may be used to determine a physical orientation of the user device.

The present disclosure is described more fully in the context of FIGS. 1-14 below.

Figure 1:
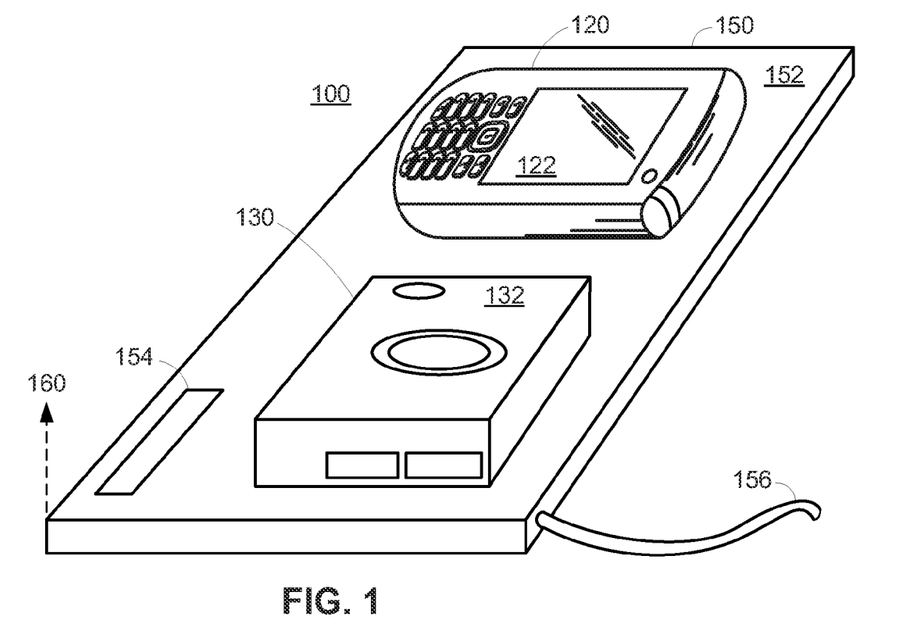
FIG. 1 shows an illustrative docking arrangement in accordance with some embodiments of the present disclosure.

FIG. 1 shows illustrative docking arrangement 100 in accordance with some embodiments of the present disclosure. Docking arrangement 100 may include user device 120 (e.g., a personal communications device) and user device 130 (e.g., a digital camera) positioned on surface 152 of docking device 150. Docking arrangement 100 may include user device 120 in a physical orientation with face 122 facing in direction 160. Docking arrangement 100 may include user device 130 in a physical orientation with face 132 facing in direction 160.

In some embodiments, docking device 150 may include surface 152, configured to inductively charge user device 120, user device 130, or both. Docking device 150 may include, for example, a wire coil which may provide a magnetic field with which corresponding coils in user devices 120 and 130 may interact to charge energy storage devices (e.g., batteries) which may be included in user devices 120 and 130.

In some embodiments, docking device 150 may be configured to communicate with user device 120, 130, or both, using, for example, transmitter/receiver 154. Transmitter/receiver 154 may be configured as an infrared (IR) transmitter/receiver, a WiFi transmitter/receiver, a BLUETOOTH transmitter/receiver, an ultra wide band (UWB) transmitter/receiver, a radio frequency (RF) transmitter/receiver, or any other suitable type of transmitter/receiver, any suitable accompanying hardware or software, or any combination thereof. In some embodiments, user device 120, 130, or both, may include a corresponding transmitter/receiver which may be configured to communicate with transmitter/receiver 154. In some embodiments, user device 120, 130, or both may be coupled via a cable or other suitable wired connection (e.g., a USB cable with suitable connectors) to docking device 150.

Illustrative direction 160 may be oriented normal to surface 152, and is shown in FIG. 1 as being directed "upwards" (e.g., substantially opposite to the force of gravity on an object). Directions normal to direction 160 may represent the plane of surface 152 of docking device 150, which may rest on a base surface (not shown) such as, for example, a desk top, table top, or counter top. It will be understood that a docking arrangement may be arranged in any suitable orientation (e.g., direction 160 may point in any suitable direction).

Figure 2:
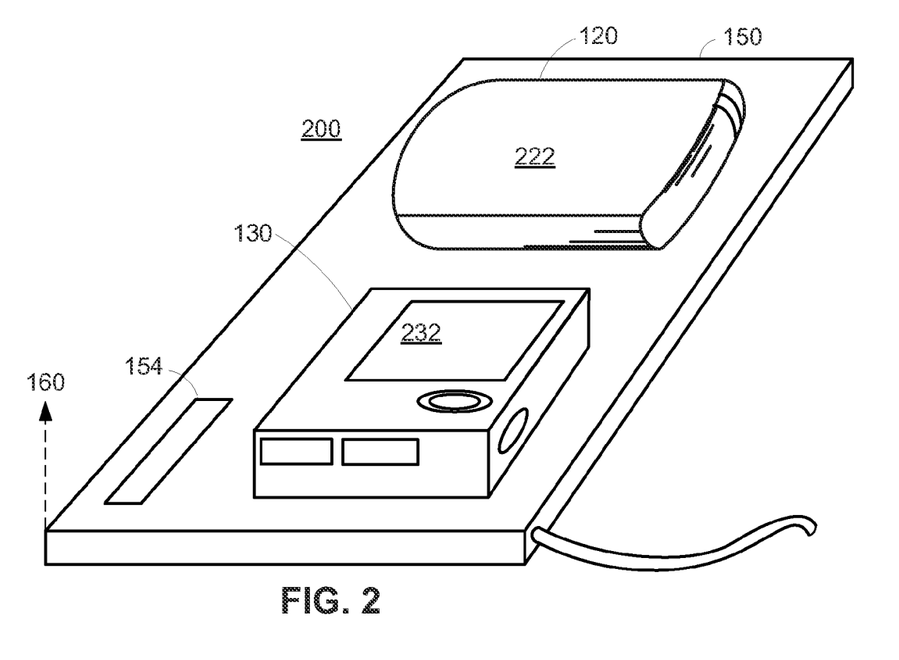
FIG. 2 shows an illustrative docking arrangement in accordance with some embodiments of the present disclosure.

FIG. 2 shows illustrative docking arrangement 200 in accordance with some embodiments of the present disclosure. Docking arrangement 200 may include user device 120 and user device 130 positioned on surface 152 of docking device 150. Docking arrangement 200 may include user devices 120 and 130 in a different physical orientation relative to docking arrangement 100 of FIG. 1. For example, docking arrangement 200 may include user device 120 oriented with face 222, which may be opposite to face 122, facing in direction 160. In a further example, docking arrangement 200 may include user device 130 oriented with face 232, which may be opposite to face 132, facing in direction 160.

In some embodiments, one or more docking functions may be provided to user device 120, 130, or both, by docking device 150, an external device coupled to docking device 150 (e.g., via coupling 156), any other suitable device, or any combination thereof. In some embodiments, the one or more docking functions selected, provided, or both, for user device 120, 130, or both, may depend on the user device's physical orientations. For example, in some embodiments, when user device 120 is physically oriented face up on surface 152 (e.g., as shown by docking arrangement 100 of FIG. 1), data synchronization with an external device coupled to docking device 150 may be selected, performed, or both. In a further example, when user device 120 is physically oriented face down on surface 152 (e.g., as shown by docking arrangement 200 of FIG. 2), inductive charging of user device 120 may be selected, performed, or both. In a further example, when user device 130 is physically oriented face up on surface 152 (e.g., as shown by docking arrangement 100 of FIG. 1), synchronizing image files of user device 120 and docking device 150 may be selected, performed, or both. In a further example, when user devices 120 and 130 are physically oriented face up on surface 152 (e.g., as shown by docking arrangement 100 of FIG. 1), synchronizing image files between user device 120 and user device 130 may be selected, performed, or both.

Shown in FIGS. 3-7 are respective illustrative docking arrangements 300-700, which illustrate exemplary physical orientations of a user device.

Figures 3, 4:
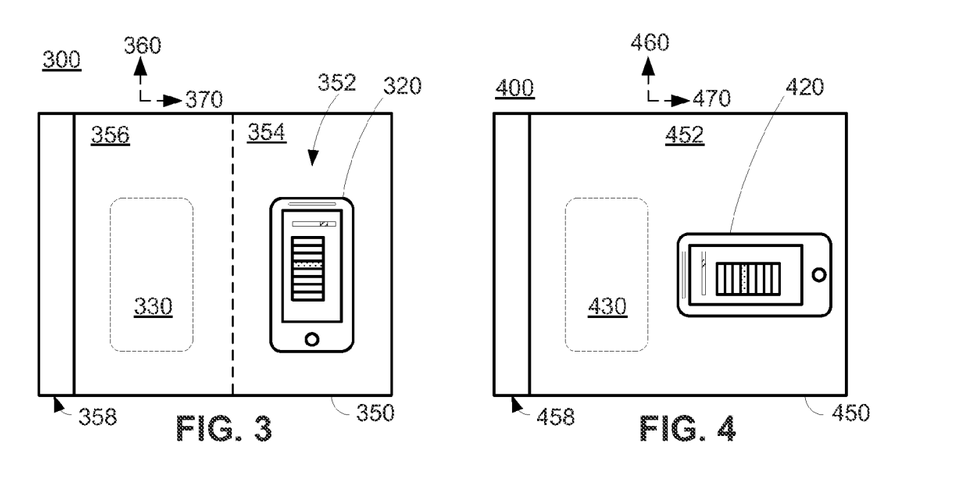
FIG. 3 shows a top plan view of an illustrative docking arrangement showing a translational position of a user device in accordance with some embodiments of the present disclosure.
FIG. 4 shows a top plan view of an illustrative docking arrangement showing a rotational position of a user device in accordance with some embodiments of the present disclosure.

FIG. 3 shows a top plan view of illustrative docking arrangement 300 in accordance with some embodiments of the present disclosure. Docking arrangement 300 may include user device 320 positioned on surface 352 of docking device 350. Surface 352, substantially in the plane of directions 360 and 370, may include region 354 partitioned from the rest of surface 352 by illustrative partition 380, which need not be visible to a user. In some embodiments, user device 320 may be alternatively positioned at position 330, which may be located in region 356 of surface 352. Depending upon which region (e.g., region 354 or region 356) user device 320 is placed, one or more particular docking functions may be provided to user device 320. For example, when user device 320 is physically oriented on region 354, inductive charging may be provided to user device 320. In a further example, when user device 320 is physically oriented on region 356, data synchronization may be provided between user device 320 and docking device 350. Surface 352 may be partitioned into any suitable number of regions ("zones"), in any suitable configuration. For example, surface 352 may include multiple regions in the shape of concentric circles. In a further example, surface 352 may include a grid of multiple partitions which may intersect, forming an array of regions. Any suitable configuration of regions, corresponding to any suitable docking functions, may be used in accordance with the present disclosure.

FIG. 4 shows a top plan view of illustrative docking arrangement 400 in accordance with some embodiments of the present disclosure. Docking arrangement 400 may include user device 420 positioned on surface 452, substantially in the plane of directions 460 and 470, of docking device 450. In some embodiments, user device 420 may be alternatively rotated and translated to position 430 on surface 452. Depending upon the translational position, rotational position, or both, of user device 420, one or more particular docking functions may be provided to user device 420. For example, when user device 420 is physically oriented along (e.g., rotationally positioned along) direction 460, inductive charging may be provided to user device 420. In a further example, when user device 420 is physically oriented along (e.g., rotationally positioned along) direction 470, data synchronization may be provided between user device 420 and docking device 450. In a further example, when user device 420 is physically oriented at (e.g., translationally positioned at) position 430, a diagnostic check of user device 420 may be performed. Any suitable physical orientation, including any suitable translation position or rotation position, or both, may be used in accordance with the present disclosure.

Figures 5, 6:
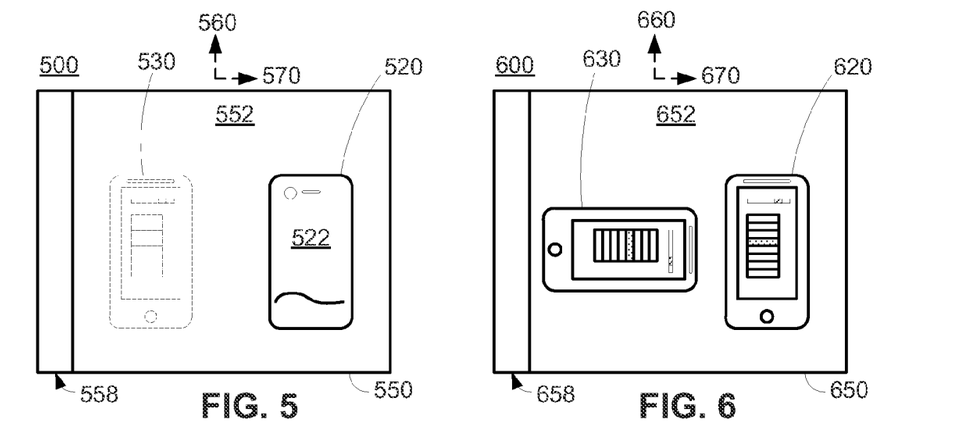
FIG. 5 shows a top plan view of an illustrative docking arrangement showing a facing direction of a user device in accordance with some embodiments of the present disclosure.
FIG. 6 shows a top plan view of an illustrative docking arrangement of two user devices in accordance with some embodiments of the present disclosure.

FIG. 5 shows illustrative docking arrangement 500 in accordance with some embodiments of the present disclosure. Docking arrangement 500 may include user device 520 positioned on surface 552, substantially in the plane of directions 560 and 570, of docking device 550. In some embodiments, user device 520, which may include a display screen, may be facing down (e.g., back face 522 facing up) on surface 552. Facing "down" is illustratively shown in FIG. 5 as user device 520 having a display screen facing in a direction coincident with the cross product of direction 560 and 570 (e.g., direction 560×direction 570), and back face 522 facing in the opposite direction. User device 520 may alternatively be rotated, as shown by physical orientation 530, so that user device is facing up, or any other suitable direction. Depending upon the direction user device 520 is facing (e.g., up, down, left, right, forward, backward), one or more particular docking functions may be provided to user device 520. For example, when user device 520 is physically oriented face down on surface 552, inductive charging may be provided to user device 520. In a further example, when user device 520 is physically oriented face up on surface 552, data synchronization may be provided between user device 520 and docking device 550. Any suitable physical orientation, including any suitable face direction may be used in accordance with the present disclosure.

FIG. 6 shows illustrative docking arrangement 600 in accordance with some embodiments of the present disclosure. Docking arrangement 600 may include user devices 620 and 630 positioned on surface 652, substantially in the plane of directions 660 and 670, of docking device 650. In some embodiments, user device 620 may be physically oriented (e.g., translationally positioned, rotationally positioned, directionally faced) differently than user device 630 on surface 652. Depending upon the translational position, rotational position, face direction, or combinations thereof, of user device 620 and user device 630, one or more particular docking functions may be provided to user device 620 and user device 630. In some embodiments, one or more particular docking functions may be provided to user device 620 and user device 630 depending upon their relative physical orientation. In some embodiments, one or more particular docking functions may be provided to user device 620 and user device 630 depending upon their individual physical orientations on surface 652. For example, when user devices 620 and 630 are both physically oriented along (e.g., rotationally positioned along) direction 660, inductive charging may be provided to both user device 620 and user device 630. In a further example, when user devices 620 and 630 are physically oriented along different directions (e.g., direction 660 and direction 670, as shown in FIG. 6), data synchronization may be provided between user device 620 and user device 630. In a further example, when user device 620 is physically oriented face up on surface 652, and user device 630 is physically oriented face down on surface 652, both inductive charging and data synchronization may be provided for both user device 620 and user device 630. Any suitable physical orientation, including any suitable translation position, rotation position, face direction, or combinations thereof, of more than one user device may be used in accordance with the present disclosure.

Figure 7:
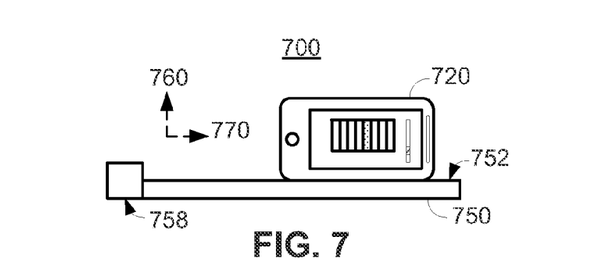
FIG. 7 shows a side elevation view of an illustrative docking arrangement showing a rotational position of a user device in accordance with some embodiments of the present disclosure.

FIG. 7 shows illustrative docking arrangement 700 in accordance with some embodiments of the present disclosure. Docking arrangement 700 may include user device 720 positioned on surface 752 of docking device 750. In some embodiments, user device 720, which may include a display screen, may be facing any direction normal to direction 760 on surface 752. Facing "forward" is illustratively shown in FIG. 7 as user device 720 having a display screen facing in a direction coincident with the cross product of direction 770 and 760 (e.g., direction 770×direction 760). User device 720 may alternatively be rotated about direction 760 to any other suitable position so that user device is facing any other suitable direction. Depending upon the direction user device 720 is facing, one or more particular docking functions may be provided to user device 720. For example, when user device 720 is physically oriented face forward on surface 752, a diagnostic check may be provided to user device 720. In a further example, when user device 720 is physically oriented face backward (e.g., opposite to face forward) on surface 752, data backup to a memory storage device may be provided to user device 720. Any suitable physical orientation may be used in accordance with the present disclosure.

In some embodiments, a docking device may include one or more components other than a surface, such as segments 358, 458, 558, 658 and 758 of FIGS. 3-7, respectively. A segment of a docking device may include processing equipment, memory, a display, a user interface, one or more I/O interfaces, one or more sensors, any other suitable components, or any combination thereof. A segment may be coupled to a surface in any suitable manner (e.g., wired, wireless, optical, mechanical), or may be integrated with a surface in any suitable manner. For example, segment 358 may include one or more optical sensors (e.g., line of sight sensors/detectors, imaging detectors, IR detectors) for determining a physical orientation of user device 320 when placed on surface 352. In a further example, segment 458 may include one or more tactile sensors (e.g., piezoelectric, capacitive, resistive) integrated into surface 452, which may detect a physical orientation of user device 420 on surface 452. In a further example, segment 558 may include an I/O interface such as a USB port configured to communicate via a wired cable with a host computer, which may provide one or more docking functions (e.g., data synchronization via WiFi network) to user device 520.

In some embodiments, a docking device may provide an indication of a selected docking function. An indication may include an audio sound (e.g., from a speaker included in the docking device), a graphic displayed on a display screen of the docking device, an electronic message notification (e.g., transmitted by a transmitter of the docking device), a vibration of the user device (e.g., using a piezoelectric motor of the docking device), any other suitable indication, or any combination thereof. For example, in some embodiments, a docking device may display an arrow (e.g., indicating a direction of data transfer) or text (e.g., indicating a function by label) on a display screen integrated into a surface (e.g., an inductive charging surface) indicating information about a selected docking function.

Any of the illustrative physical orientations shown in FIGS. 3-7 may be combined, translated, rotated, or otherwise altered in accordance with the present disclosure. Any suitable docking function may be selected, performed, or both, for a docked user device positioned in any suitable physical orientation. Although illustratively shown as being horizontal, a surface configured to receive a user device may be oriented in any suitable position.

Figure 8A:
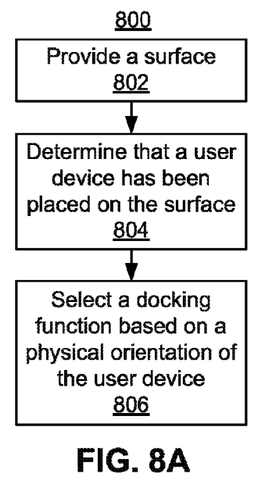
FIG. 8A is a flow diagram of illustrative steps for selecting a docking function in accordance with some embodiments of the present disclosure.

FIG. 8A is flow diagram 800 of illustrative steps for selecting a docking function in accordance with some embodiments of the present disclosure. The illustrative steps of flow diagram 800 may be performed by any suitable processing equipment included in a user device, docking device, external device, remote application server, any other suitable processing equipment, or any combination thereof.

Step 802 may include providing a surface ("a receiving surface") upon which a user device may be placed. In some embodiments, the surface may be included as part of a docking device, and may be configured to inductively charge a user device placed on the surface. The surface may be included as part of a docking device which may also include processing circuitry, memory, one or more sensors, one or more I/O interfaces, one or more user interfaces, any other suitable components, or any combination thereof. In some embodiments, the surface may be substantially horizontal, although the surface may be oriented in any suitable direction.

Step 804 may include determining that a user device has been placed on a surface (e.g., docked). In some embodiments, one or more sensors may be used to determine that a user device has been docked. In some embodiments, a user input may be received to a suitable user interface indicating that a user device has been docked. For example, in some embodiments, an array of tactile sensors integrated into the surface may be used to detect that a user device has been placed on the surface. In a further example, one or more optical sensors such as a line of sight sensor (e.g., a substantially linear emitter and detector arrangement which may detect an opaque object placed in the beam path) may be used to detect that a user device has been placed on the surface.

Step 806 may include selecting a docking function based at least in part on a physical orientation of a user device on a surface. In some embodiments, step 806 may be performed in response to a determination at step 804 that a user device has been placed on the surface. In some embodiments, step 806 may include an authorization action such as, for example, determining whether a user device is authorized to be docked. In some embodiments, step 806 may include a confirmation such as, for example, confirmation that a user device is authorized to be docked, a confirmation that a user device is properly docked (e.g., placed completely on the surface), or any other suitable confirmation, or any combination thereof. In some embodiments, one or more docking functions may be selected from a plurality of docking functions based on the physical orientation of the docked user device. In some embodiments, a docking function may be selected based on user input to a user interface (e.g., user selected preferences) which may be received. For example, in some embodiments, charging may be selected as the docking function from a plurality of docking functions including charging, syncing, and diagnostic checking. Any suitable docking function may be selected, from any suitable plurality of docking functions, based on any suitable physical orientation of a docked user device, in accordance with the present disclosure.

Figure 8B:
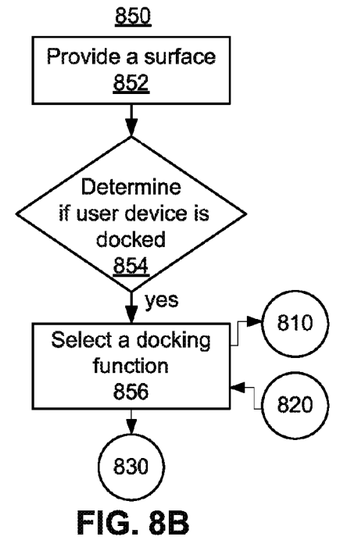
FIG. 8B is a flow diagram of illustrative steps for selecting a docking function in accordance with some embodiments of the present disclosure.

FIG. 8B is flow diagram 850 of illustrative steps for selecting a docking function in accordance with some embodiments of the present disclosure. The illustrative steps of flow diagram 850 may be performed by any suitable processing equipment included in a user device, docking device, external device, remote application server, any other suitable processing equipment, or any combination thereof.

Step 852 may include providing a surface ("a receiving surface") upon which a user device may be placed. In some embodiments, the surface may be included as part of a docking device, and may be configured to inductively charge a user device placed on the surface. The surface may be included as part of a docking device which may also include processing circuitry, memory, one or more sensors, one or more I/O interfaces, one or more user interfaces, any other suitable components, or any combination thereof. In some embodiments, the surface may be substantially horizontal, although the surface may be oriented in any suitable direction.

Step 854 may include determining whether a user device has been placed on a surface (e.g., docked). In some embodiments, one or more sensors may be used to determine whether a user device has been docked. In some embodiments, a user input may be received to a suitable user interface indicating that a user device has been docked. For example, in some embodiments, an array of tactile sensors integrated into the surface may be used to detect that a user device has been placed on the surface. In a further example, one or more optical sensors such as a line of sight sensor (e.g., a substantially linear emitter and detector arrangement which may detect an opaque object placed in the beam path) may be used to detect that a user device has been placed on the surface.

Step 856 may include selecting a docking function based at least in part on a physical orientation of a user device on a surface. In some embodiments, step 856 may be performed in response to a determination at step 854 that a user device has been docked. In some embodiments, step 856 may include an authorization action such as, for example, determining whether a user device is authorized to be docked. In some embodiments, step 856 may include a confirmation such as, for example, confirmation that a user device is authorized to be docked, a confirmation that a user device is properly docked (e.g., placed completely on the surface), or any other suitable confirmation, or any combination thereof. In some embodiments, one or more docking functions may be selected from a plurality of docking functions based on the physical orientation of the docked user device. In some embodiments, a docking function may be selected based on user input to a user interface (e.g., user selected preferences) which may be received. For example, in some embodiments, charging may be selected as the docking function from a plurality of docking functions including charging, syncing, and diagnostic checking. Any suitable docking function may be selected, from any suitable plurality of docking functions, based on any suitable physical orientation of a docked user device, in accordance with the present disclosure.

Figure 11:
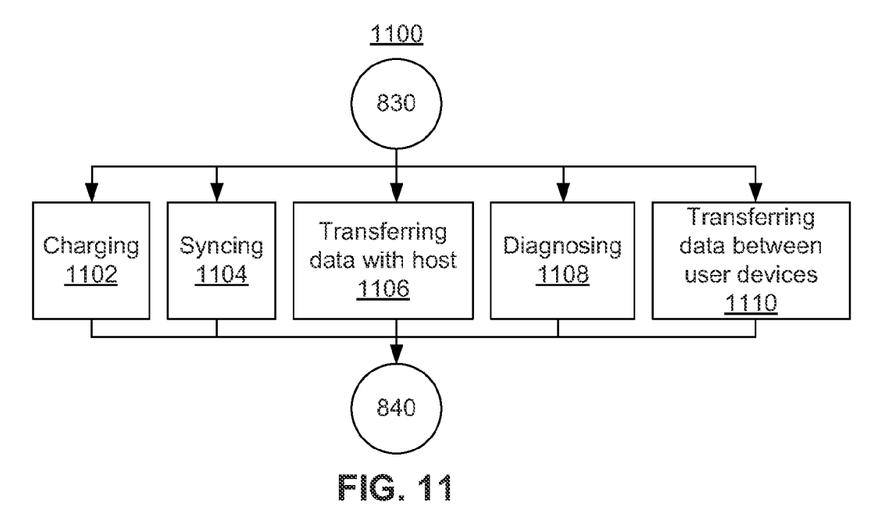
FIG. 11 is a flow diagram of illustrative docking functions in accordance with some embodiments of the present disclosure.
Figure 12:
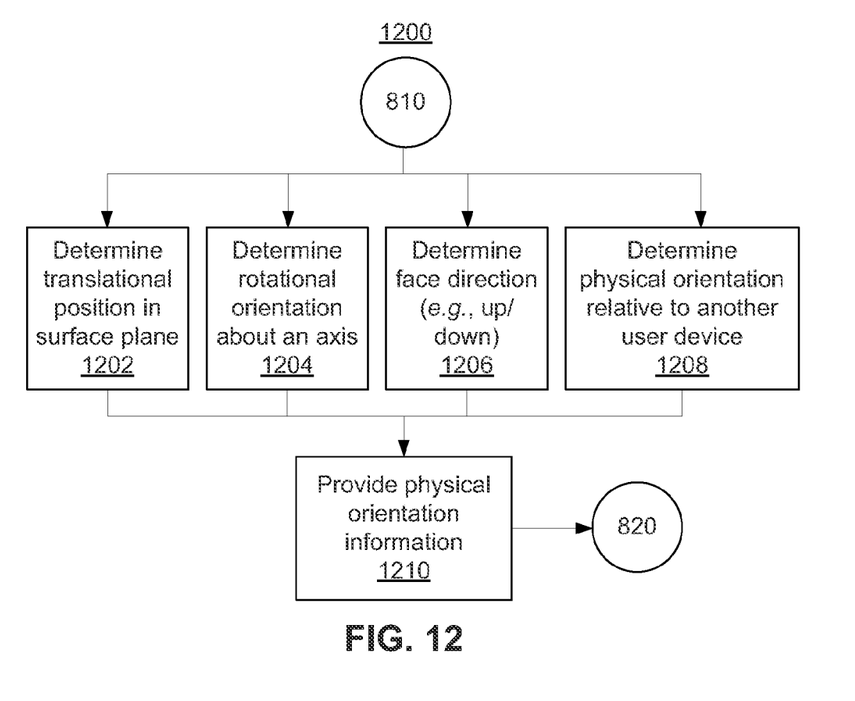
FIG. 12 is a flow diagram of illustrative steps for determining a physical orientation of a user device in accordance with some embodiments of the present disclosure.

In some embodiments, any of the illustrative steps of flow diagram 1200, flow diagram 1100, or both may be performed along with the illustrative steps of flow diagram 850, as shown by markers 810, 820 and 830 of FIG. 8B.

Figure 9:
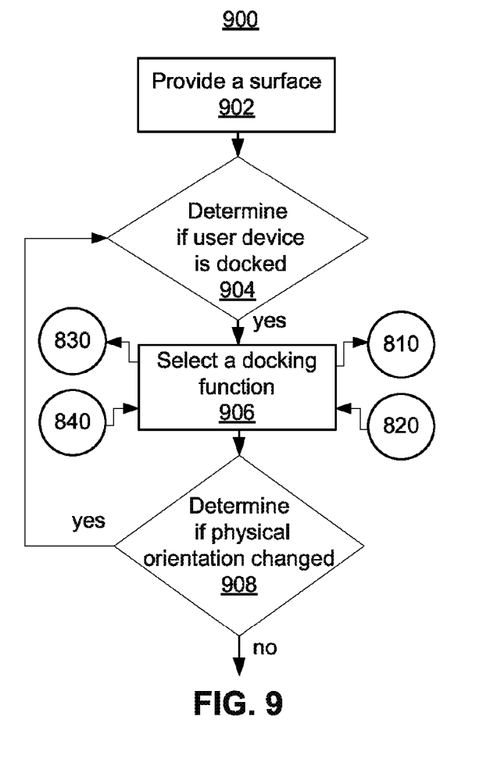
FIG. 9 is a flow diagram of illustrative steps for selecting a docking function if a physical orientation of a user device changes in accordance with some embodiments of the present disclosure.

FIG. 9 is flow diagram 900 of illustrative steps for selecting a docking function if a physical orientation of a user device changes in accordance with some embodiments of the present disclosure. The illustrative steps of flow diagram 900 may be performed by any suitable processing equipment included in a user device, docking device, external device, remote application server, any other suitable processing equipment, or any combination thereof.

Step 902 may include providing a surface, upon which a user device may be placed (e.g., docked). In some embodiments, the surface may be included as part of a docking device, and may be configured to inductively charge a user device placed on the surface. The surface may be included as part of a docking device which may also include processing circuitry, memory, one or more sensors, one or more I/O interfaces, one or more user interfaces, any other suitable components, or any combination thereof. In some embodiments, the surface may be substantially horizontal, although the surface may be oriented in any suitable direction.

Step 904 may include determining whether a user device has been placed on a surface. In some embodiments, one or more sensors may be used to determine whether a user device has been docked. In some embodiments, a user input may be received to a suitable user interface indicating that a user device has been docked. For example, in some embodiments, an array of tactile sensors integrated into the surface may be used to detect that a user device has been placed on the surface. In a further example, one or more optical sensors such as a line of sight sensor may be used to detect that a user device has been placed on the surface.

Step 906 may include selecting a docking function based at least in part on a physical orientation of a user device on a surface. In some embodiments, step 906 may be performed in response to a determination at step 904 that a user device has been docked. In some embodiments, step 906 may include an authorization action such as, for example, determining whether a user device is authorized to be docked. In some embodiments, step 906 may include a confirmation such as, for example, confirmation that a user device is authorized to be docked, a confirmation that a user device is properly docked (e.g., placed completely on the surface), or any other suitable confirmation, or any combination thereof. In some embodiments, one or more docking functions may be selected from a plurality of docking functions based on the physical orientation of a docked user device. In some embodiments, a docking function may be selected based on user input to a user interface (e.g., user selected preferences). For example, in some embodiments, charging may be selected as the docking function from a plurality of docking functions including charging, syncing, and diagnostic checking. Any suitable docking function may be selected, from any suitable plurality of docking functions, based on any suitable physical orientation of a docked user device, in accordance with the present disclosure.

In some embodiments, any of the illustrative steps of flow diagram 1200, flow diagram 1100, or both may be performed along with the illustrative steps of flow diagram 900 (e.g., step 906), as shown by markers 810, 820, 830, and 840 of FIG. 9.

Step 908 may include determining whether a physical orientation of a docked user device has changed. In some embodiments, step 908 may include determining that a translational position, rotational position, face direction, or any other suitable physical orientation, or combination thereof, has changed relative to a previous physical orientation. For example, in some embodiments, a user may reposition a user device on a surface to cause a different docking function to be selected. In some embodiments, if it is determined at step 908 that a physical orientation of a docked user device has changed, step 904 may be repeated, as shown in FIG. 9. In some embodiments, it may be determined at step 908 that a physical orientation of a docked user device has not changed relative to a previous physical orientation. In some embodiments, if a physical orientation of a docked user device has not changed, no change need be made to the selected docking function (e.g., the docking function selected at step 906).

Figure 10:
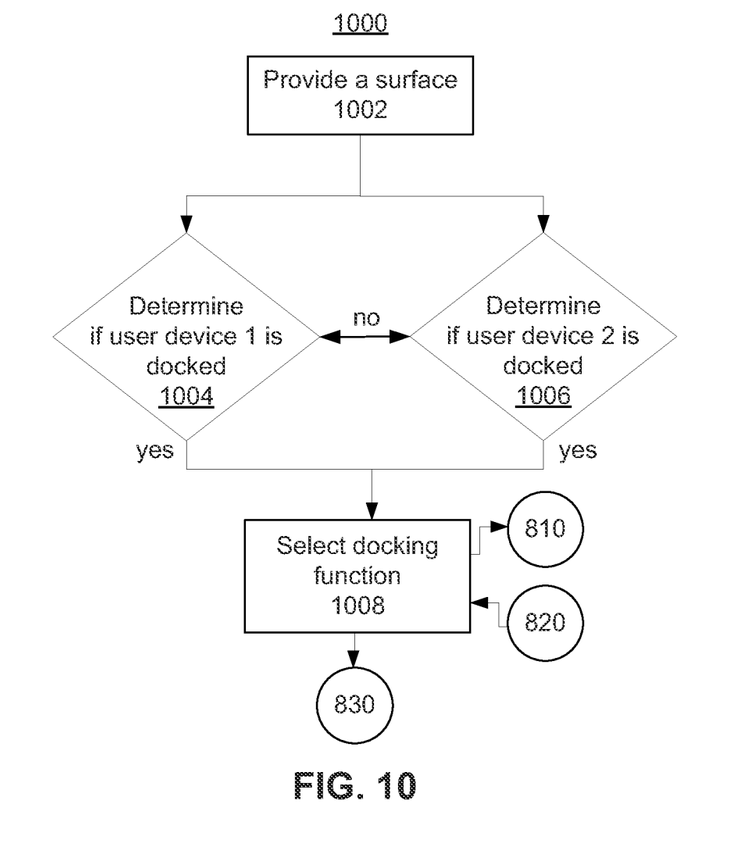
FIG. 10 is a flow diagram of illustrative steps for selecting a docking function for more than one user device in accordance with some embodiments of the present disclosure.

FIG. 10 is flow diagram 1000 of illustrative steps for selecting a docking function for more than one user device in accordance with some embodiments of the present disclosure. The illustrative steps of flow diagram 1000 may be performed by any suitable processing equipment included in a user device, docking device, external device, remote application server, any other suitable processing equipment, or any combination thereof.

Step 1002 may include providing a surface, upon which a user device may be placed. In some embodiments, the surface may be included as part of a docking device, and may be configured to inductively charge a user device placed on the surface. The surface may be included as part of a docking device which may also include processing circuitry, memory, one or more sensors, one or more I/O interfaces, one or more user interfaces, any other suitable components, or any combination thereof. In some embodiments, the surface may be substantially horizontal, although the surface may be oriented in any suitable direction.

Step 1004 may include determining whether a first user device has been placed on a surface (e.g., docked). In some embodiments, one or more sensors may be used to determine whether a first user device has been docked. In some embodiments, a user input may be received to a suitable user interface indicating that a first user device has been docked. For example, in some embodiments, an array of tactile sensors integrated into the surface may be used to detect that a first user device has been placed on the surface. In a further example, one or more optical sensors such as a line of sight sensor may be used to detect that a first user device has been placed on the surface.

Step 1006 may include determining whether a second user device has been placed on a surface (e.g., docked). In some embodiments, the second user device may be placed on the same surface as the first user device of step 1004. In some embodiments, one or more sensors may be used to determine whether a second user device has been docked. In some embodiments, a user input may be received to a suitable user interface indicating that a second user device has been docked.

In some embodiments, it may be determined at step 1004 or step 1006, or both, that user device 1 or 2, or both, has not been docked. In some embodiments, processing equipment may check at some regular or irregular time interval whether user device 1 or 2, or both, have been docked. For example, in some embodiments, suitable processing equipment may sample the output of one or more sensors configured to detect a physical orientation of a user device every minute. Any suitable technique may be used to determine whether a user device is docked, schedule the determination, or otherwise manage determining whether a user device has been docked.

Step 1008 may include selecting a docking function based at least in part on a physical orientation of a first user device, a second user device, or both, on a surface. In some embodiments, step 1008 may be performed in response to a determination at step 1004, step 1006, or both that one or more user devices (e.g., first user device of step 1004, second user device of step 1006) have been docked. In some embodiments, step 1008 may include an authorization action such as, for example, determining whether a user device is authorized to be docked. In some embodiments, step 1008 may include a confirmation such as, for example, confirmation that a user device is authorized to be docked, a confirmation that a user device is properly docked (e.g., placed completely on the surface), or any other suitable confirmation, or any combination thereof. In some embodiments, one or more docking functions may be selected from a plurality of docking functions based on the physical orientation of the one or more docked user devices. In some embodiments, a docking function may be selected based on user input to a user interface (e.g., user selected preferences) which may be received. For example, in some embodiments, charging may be selected as the docking function from a plurality of docking functions including charging, syncing, and diagnostic checking. Any suitable docking function may be selected, from any suitable plurality of docking functions, based on any suitable physical orientation of any suitable number of docked user devices, in accordance with the present disclosure.

In some embodiments, any of the illustrative steps of flow diagram 1200, flow diagram 1100, or both may be performed along with the illustrative steps of flow diagram 1000 (e.g., step 1008), as shown by markers 810, 820, and 830 of FIG. 10.

FIG. 11 is flow diagram 1100 of illustrative docking functions in accordance with some embodiments of the present disclosure. The illustrative steps of flow diagram 1100 may be performed by any suitable processing equipment included in a user device, docking device, external device, remote application server, any other suitable processing equipment, or any combination thereof. Docking functions may include charging at step 1102, syncing at step 1104, transferring data with a host device at step 1106, diagnosing at step 1108, transferring data between user devices at step 1110, any other suitable docking functions, or any combination thereof.

In some embodiments, step 1102 may include a docking device providing a suitable magnetic field near a surface (e.g., designated as a "charging surface"). A user device placed on the surface may include circuitry (e.g., a coil, conditioning circuitry) which may interact with the magnetic field, and charge an energy storage device (e.g., a lithium-ion battery) included in the user device. In some embodiments, step 1102 may include a docking device providing charging to a user device using any suitable wired coupling (e.g., USB cable coupling, 30-pin plug coupling), wireless coupling, or both.

In some embodiments, step 1104 may include a docking device, external device, or both, synchronizing data with a user device placed on a surface. In some embodiments, during data synchronization no charging (e.g., inductive charging) need be provided by the surface. For example, a user device may be placed face up on a surface of a socking device, and step 1104 may be selected as a docking function to be performed. In a further example, step 1104 may include synchronizing media files, contacts, folders, electronic documents, any other suitable data, or any combination thereof.

In some embodiments, step 1106 may include uploading or downloading, or both, data from a host device such as a computer, docking device, server, any other suitable host device, or any combination thereof. In some embodiments, step 1106 may be performed by transferring data over a suitable wireless network using any suitable protocol (e.g., WiFi, BLUETOOTH, UWB, RF, IR). In some embodiments, a docking device may be included in a host device, such as a docking station included as part of a laptop computer.

In some embodiments, step 1108 may include performing one or more checks of one or more functions, hardware components, systems, software components, or combinations thereof of a user device placed on a surface of a docking device. For example, step 1108 may include performing a check on the memory hardware of a user device (e.g., determining memory capacity, locating corrupted memory elements). In a further example, step 1108 may include determining whether any software installed on a user device may be updated with a newer available version. In a further example, step 1108 may include determining whether charging is recommended for the user device (e.g., the accumulated energy in a battery of the user device is below a threshold).

In some embodiments, step 1110 may include uploading, downloading, synchronizing, or combination thereof, of any suitable data between more than one user device placed on a surface of a docking device. In some embodiments, step 1110 may include transferring data over any suitable wireless network using any suitable protocol (e.g., WiFi, BLUETOOTH, UWB, RF, IR).

In some embodiments, any of the docking functions of flow diagram 1100 or any other suitable docking functions may be combined, performed or selected concurrently, performed or selected in a particular sequence, restricted from being performed or selected, or otherwise managed in accordance with the present disclosure.

FIG. 12 is flow diagram 1200 of illustrative steps for determining a physical orientation of a user device in accordance with some embodiments of the present disclosure. The illustrative steps of flow diagram 1200 may be performed by any suitable processing equipment included in a user device, docking device, external device, remote application server, any other suitable processing equipment, or any combination thereof.

In some embodiments, step 1202 may include determining a translational position of a user device on a surface of a docking device. A translational position may include Cartesian coordinates, polar coordinates, spherical coordinates, any other suitable coordinates in any suitable number of spatial dimensions (e.g., 1-3 dimensional coordinates), or any combination thereof. A translational position may be determined relative to any suitable datum which may include a point (e.g., a particular position or "origin"), line (e.g., an edge), plane (e.g., a surface), any other suitable reference geometry, or any combination thereof.

In some embodiments, step 1204 may include determining a rotational position of a user device on a surface of a docking device. A rotational position may include an angular position, about any suitable axis, referenced to any suitable reference angular position. For example, a rotational position may be determined in Cartesian coordinates (e.g., using a rotation matrix) polar coordinates, spherical coordinates, any other suitable coordinates in any suitable number of spatial dimensions (e.g., 1-3 dimensional coordinates), or any combination thereof.

In some embodiments, step 1206 may include determining a face direction of a user device on a surface of a docking device. A face direction may include any suitable direction in any suitable number of spatial dimensions. In some embodiments, a face direction may include a discreet face direction (e.g., up, down, left, right, forward, backward), or a continuous range of face directions (e.g., 0.1 radians clockwise from front), or a combination thereof. For example, it may be determined that a user device is face down on a surface of a surface.

In some embodiments, step 1208 may include determining a physical orientation of a user device relative to another user device, in which both user devices are on a surface of a docking device. A relative position may include a relative translational position, relative rotational position, relative face direction, any other suitable relative physical orientation, or any combination thereof. For example, it may be determined that two user devices have the same face direction on a surface of a docking device.

In some embodiments, any of the physical orientation determinations of flow diagram 1200 or any other suitable physical orientation determinations may be combined or otherwise altered in accordance with the present disclosure.

Any of the illustrative steps of flow diagrams 800-1200 of respective FIGS. 8A-12 may be combined with other steps, rearranged with other steps, omitted, appended with additional steps, or otherwise altered in accordance with the present disclosure.

Figure 13:
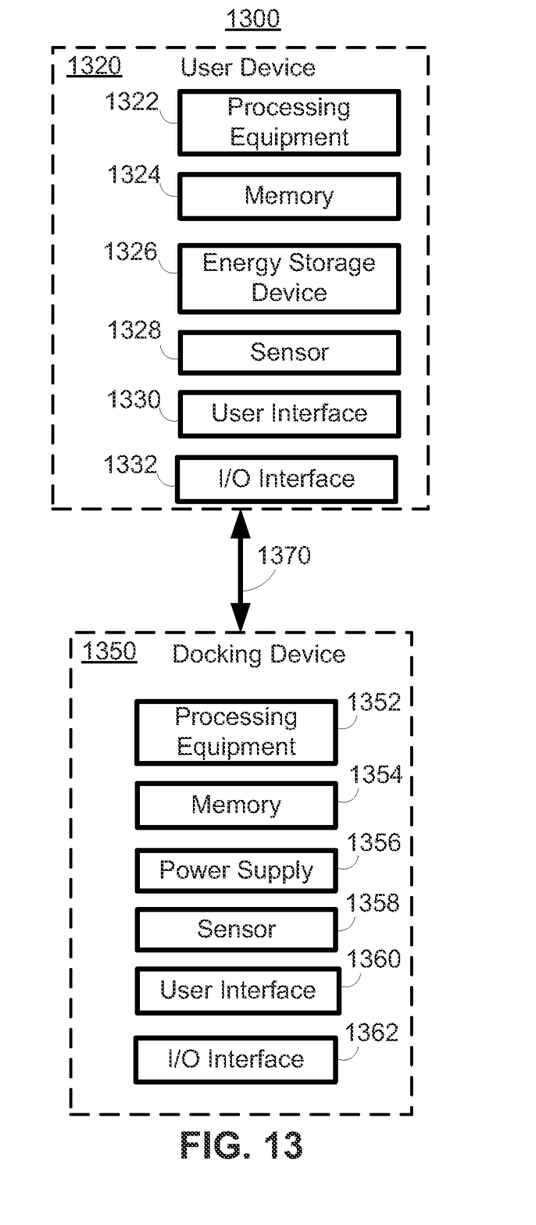
FIG. 13 is a diagram of an illustrative docking arrangement including a user device coupled to a docking device in accordance with some embodiments of the present disclosure.

FIG. 13 is a diagram of illustrative docking arrangement 1300 including user device 1320 coupled to docking device 1350 via communicative coupling 1370 in accordance with some embodiments of the present disclosure. User device 1320 may include processing equipment 1322, memory 1324, energy storage device 1326, sensor 1328, user interface 1330, I/O interface 1332, any other suitable components, subsystems or devices, or any suitable combination thereof.

In some embodiments, user device 1320 may be coupled to processing equipment 1352, memory 1354, power supply 1356, sensor 1358, user interface 1360, I/O interface 1362, any other suitable component, or any combination thereof which may be included as part of docking device 1350, via communicative coupling 1370. Coupling 1370 may, for example, include couplings for data transfer, charging, diagnostics, accessories, any other suitable types of couplings, or any combination thereof. In some embodiments, a docking device may be coupled to, but not include, processing equipment 1352, memory 1354, power supply 1356, sensor 1358, user interface 1360, or I/O interface 1362. For example, docking device 1350 may include a surface configured to inductively charge user device 1320, and docking device 1350 may be coupled via USB cable to an external device such as a computer.

In some embodiments, user device 1320 may include processing equipment 1322 which may include a central processing unit (CPU) (e.g., microprocessor), collection of processors (e.g., parallel processors), CPU cache, random access memory (RAM), I/O communications interfaces, suitable circuitry, any other suitable processing elements or any combination thereof.

In some embodiments, user device 1320 may include memory 1324 which may be a hard drive, flash memory drive, MMC, SD card, SIM card, any other suitable memory device, or combination thereof.

In some embodiments, user device 1320 may include energy storage device 1326. Energy storage device 1326 may include, for example, a primary battery, a secondary battery (e.g., a lithium-ion battery), a super capacitor, any other suitable component which may store energy, or any combination thereof.

In some embodiments, user device 1320 may include sensor 1328. Sensor 1328 may include any suitable type of sensor, circuit, device, component, or combinations thereof which may be used to indicate whether user device 1320 is coupled to docking device 1350. For example, sensor 1328 may include one or more accelerometers, which may indicate to processing equipment 1322 the proper acceleration of user device 1320 in one or more directions. The proper acceleration of user device 1320 may provide an indication of a physical orientation of user device 1320 such as, for example, a face direction, a rotational position, or changes thereof.

In some embodiments, user device 1320 may include user interface 1330. User interface 1330 may include a display screen of any suitable type such as, for example, a liquid crystal display (LCD), a light emitting diode display (LED), a plasma display, a cathode ray tube display (CRT), an electrophoretic display, any other suitable type of display screen, or any combination thereof. User interface 1330 may include a touchscreen, touchpad, trackball, mouse, keyboard (e.g., hard button commands), speaker, microphone, camera, any other suitable components or features, or any combination thereof.

In some embodiments, user device 1320 may include I/O interface 1332. For example, I/O interface 1332 may allow user device 1320 to communicate with any type of device, component or network including an audio device, memory device, user input device, personal communication device, computer, wired network, wireless network, any other suitable device or network, or any combination thereof. In a further example, I/O interface 1332 may include one or more Ethernet ports, wireless transmitters, wireless receivers, any other suitable interfaces, any suitable interface hardware, any suitable interface software, or any combination thereof.

In some embodiments, docking device 1350 may, but need not, include processing equipment 1352 which may include a central processing unit (CPU) (e.g., microprocessor), collection of processors (e.g., parallel processors), CPU cache, random access memory (RAM), I/O communications interfaces, suitable circuitry, any other suitable processing elements or any combination thereof.

In some embodiments, docking device 1350 may, but need not, include memory 1354 which may be a hard drive, flash memory drive, MMC, SD card, SIM card, any other suitable memory device, or combination thereof.

In some embodiments, docking device 1350 may, but need not, include power supply 1356. Power supply 1356 may include, for example, an alternating current (AC) power supply (e.g., a wall socket), a direct current (DC) power supply, a transformer, a primary battery, a secondary battery, any other suitable component which may store energy, or any combination thereof. In some embodiments, communicative coupling 1370 may include an inductive coupling for charging (e.g., magnetically inducing current flow) energy storage device 1326 using power supply 1356.

In some embodiments, docking device 1350 may, but need not, include sensor 1358. Sensor 1358 may include any suitable type of sensor, circuit, device, component, or combinations thereof which may be used to indicate whether user device 1320 is coupled to docking device 1350, the physical orientation of user device 1320, any other suitable information about user device 1320, or any combination thereof. For example, sensor 1358 may include circuitry which may detect when a suitable user device has been placed on a surface (e.g., determine inductive load or capacitance, or change thereof). In some embodiments, sensor 1358 may include one or more tactile sensors (e.g., piezoelectric, capacitive, resistive) which may be integrated into a surface, and which may indicate that an object (e.g., a user device) or portion of an object thereof has been placed on a particular region of the surface. In a further example, sensor 1358 may include an imaging sensor (e.g., a CCD camera) from which an image of a user device placed on a surface may be rendered. In a further example, sensor 1358 may include an array of line of sight optical detectors. A line of sight optical detector may include a substantially linearly arranged optical path between a light source and a detector, which may indicate when an opaque or translucent object has been placed in the linear optical path.

In some embodiments, docking device 1350 may include user interface 1360. User interface 1360 may include a display screen of any suitable type such as, for example, an LCD, an LED, a plasma display, a CRT, an electrophoretic display, any other suitable type of display screen, or any combination thereof. User interface 1360 may include a touchscreen, touchpad, trackball, mouse, keyboard (e.g., hard button commands), speaker, microphone, camera, any other suitable components or features, or any combination thereof.

In some embodiments, docking device 1350 may, but need not, include I/O interface 1362. For example, I/O interface 1362 may allow docking device 1350 to communicate with any type of device, component or network including an audio device, memory, user input device, personal communication device, computer, wired network, wireless network, any other suitable device or network, or any combination thereof. In some embodiments, communicative coupling 1370 may be configured to allow communication between I/O interface 1332 of user device 1320 and I/O interface 1362 of docking device 1350.

In some embodiments, docking device 1350 may be one or more separate devices suitably coupled via communicative couplings. For example, docking device 1350 may include a first device which may include processing equipment 1352 and I/O interface 1362, and a second device which may include user interface 1360 and I/O interface 1362. Any suitable combination of devices, components, and communicative couplings may be used in accordance with the present disclosure.

Figure 14:
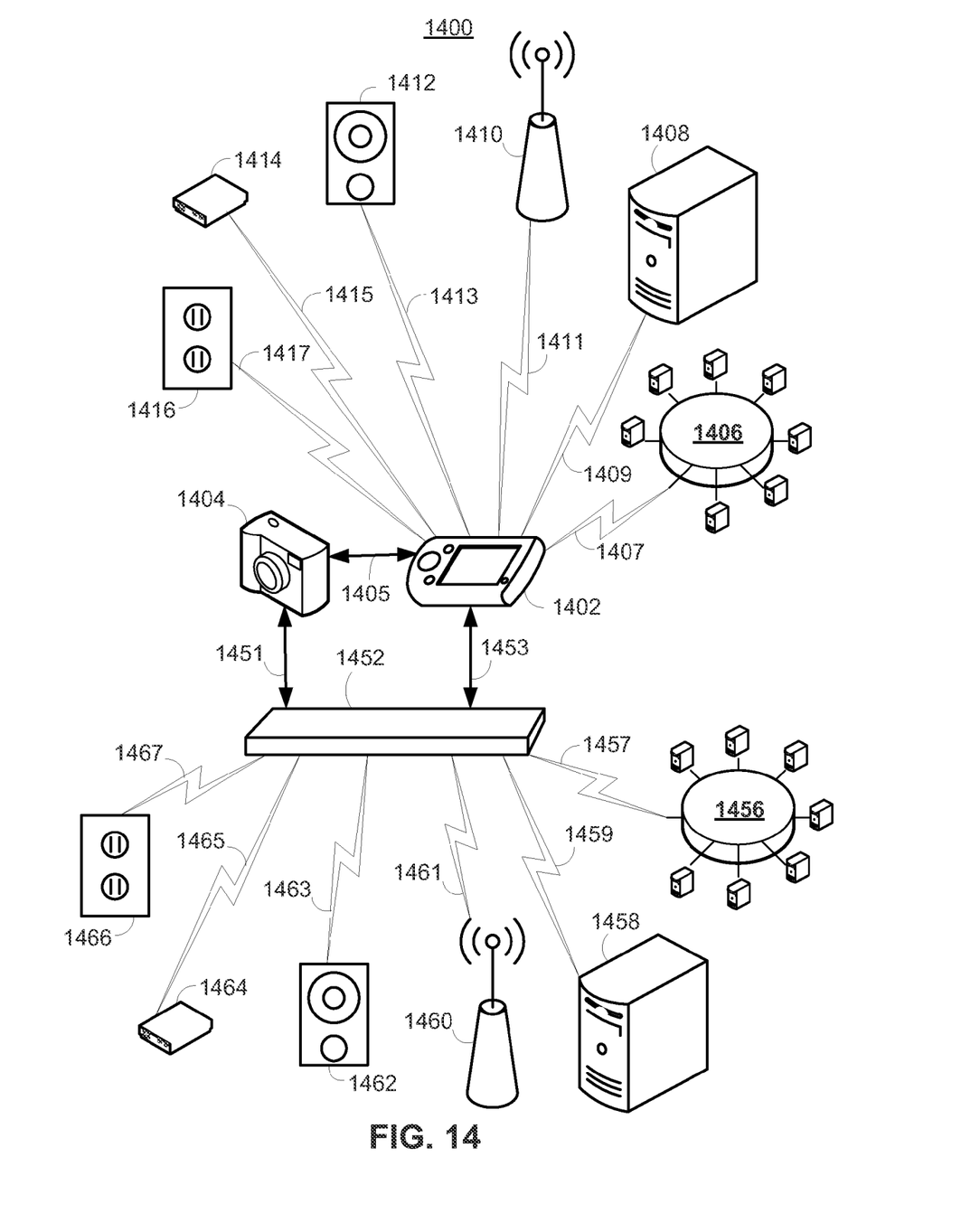
FIG. 14 is a diagram of an illustrative docking arrangement including a user device coupled to a docking device, and other devices, in accordance with some embodiments of the present disclosure.

FIG. 14 shows illustrative docking arrangement 1400 including user device 1402 coupled to docking device 1452 via coupling 1452, each configured to communicatively couple to other devices, in accordance with some embodiments of the present disclosure. Docking device 1452 may include a surface upon which user device 1402, user device 1404, or both, may be placed. In some embodiments, coupling 1452 may include an inductive coupling such as, for example, user device 1402 being positioned on a surface of docking device 1452 configured to inductively charge user device 1402. Coupling 1452 may include any suitable communicative coupling for transferring signals between user device 1402 and docking device 1452.

In some embodiments, user device 1402 may be configured to couple to user device 1404 via coupling 1405, docking device 1452 via coupling 1453, network 1406 via coupling 1407, external device 1408 via coupling 1409, wireless network 1410 via coupling 1411, audio device 1412 via coupling 1413, memory 1414 via coupling 1415, power supply 1416 via power coupling 1417, any other suitable devices, components, or networks, or any combination thereof.

For example, user device 1402 may be configured to couple to power supply 1416, which may be a wall socket, via coupling 1417 which may be a bundled cable with a wall plug and AC-DC transformer. In a further example, user device 1402 may be configured to couple to power supply 1416 which may be a power supply included in a computer via coupling 1417 which may be a USB cable with suitable 4-pin connectors. In a further example, user device 1402 may be configured to couple to audio device 1412 which may be a table top speaker system via coupling 1413 which may be a 30-pin rigid connection. In a further example, user device 1402 may be configured to couple to memory 1414 which may be a USB flash memory drive via coupling 1415 which may be a plug-in USB connection. In a further example, user device 1402 may be configured to couple to external device 1408 which may be a computer via coupling 1409 which may include a cable and plug-in USB connectors. In a further example, user device 1402 may be configured to couple to network 1406 which may be a local area network (LAN) via coupling 1407 which may include an ethernet cable and suitable 8P8C connectors. In a further example, user device 1402 may be configured to couple to wireless network 1410 which may be a wireless LAN via coupling 1411 which may allow signals to be transferred between a wireless transmitter and receiver.

In some embodiments, docking device 1452 may be configured to couple to user device 1404 via coupling 1451, user device 1402 via coupling 1453, network 1456 via coupling 1457, external device 1458 via coupling 1459, wireless network 1460 via coupling 1461, audio device 1462 via coupling 1463, memory 1464 via coupling 1465, power supply 1466 via power coupling 1467, any other suitable devices, components, or networks, or any combination thereof.

For example, docking device 1452 may be configured to couple to power supply 1466 which may be a wall socket via coupling 1467 which may be a bundled cable with a wall plug and AC-DC transformer. In a further example, docking device 1452 may be configured to couple to power supply 1466 which may be a power supply included in a computer via coupling 1467 which may be a USB cable with suitable 4-pin connectors. In a further example, docking device 1452 may be configured to couple to audio device 1462 which may be one or more speakers via coupling 1463 which may include a cable and one or more tip-ring-sleeve (TRS) connectors. In a further example, docking device 1452 may be configured to couple to memory 1464 which may be a hard disk drive via coupling 1465 which may include a cable with one or more plug-in USB connectors. In a further example, docking device 1452 may be configured to couple to external device 1458 which may be a computer via coupling 1459 which may include a cable with one or more plug-in USB connectors. In a further example, docking device 1452 may be configured to couple to network 1456 which may be a wide area network (WAN) via coupling 1457 which may include an ethernet cable and suitable plug-in 8P8C connectors. In a further example, docking device 1452 may be configured to couple to wireless network 1460 which may be a WiFi network via coupling 1461 which may allow signals to be transferred between a wireless transmitter and receiver.

Although illustratively shown as separate devices in FIG. 14, in some embodiments, power supplies 1416 and 1466, memory 1414 and 1464, audio devices 1412 and 1462, external devices 1408 and 1458 may be the same or different devices, respectively. For example, a user device may be coupled to both a docking device and an external device, which may be coupled to one another. In some embodiments, network 1406 and 1456 may be the same or different networks, and if different may be communicatively coupled with one another. In some embodiments, wireless network 1410 and 1460 may be the same or different networks, and if different, may be communicatively coupled with one another.

In some embodiments, user device 1404 may be coupled to any of the devices or networks shown in FIG. 14, any other suitable devices networks, or any combination thereof. For example, in some embodiments, user device 1402 and user device 1404 may be coupled to docking device 1452 (e.g., placed on a surface configured to provide inductive charging), and may each be configured to communicate (e.g., via BLUETOOTH wireless protocol) with external device 1458 via suitable communicative couplings. Any suitable arrangement and couplings of user devices, docking devices, other devices, networks, or combinations thereof, may be used in accordance with the present disclosure.

It will be understood that various directional and orientational terms such as "horizontal" and "vertical," "top" and "bottom" and "side," "length" and "width" and "height" and "thickness," "inner" and "outer," "internal" and "external," and the like are used herein only for convenience, and that no fixed or absolute directional or orientational limitations are intended by the use of these words. For example, the components and elements of this disclosure may have any desired orientation. If reoriented, different directional or orientational terms may need to be used in their description, but that will not alter their fundamental nature as within the scope and spirit of this disclosure.

It will also be understood that the previously discussed embodiments and examples are only illustrative of aspects of the disclosed docking arrangements, and are not presented for purposes of limitation. It will be understood that various techniques for providing docking functions based on a physical orientation of a user device may be made available to the user and examples included herein are solely for convenience. Those skilled in the art will appreciate that the disclosed user device physical orientations may be practiced by other than the described embodiments, and the disclosure is limited only by the claims that follow.

What is claimed is:

1. A method for docking a user device, the method comprising:
   providing a surface upon which the user device may be placed;

determining that the user device has been placed on the surface; and determining that a second user device has been placed on the surface;

determining, with processing equipment, a physical orientation of the user device on the surface;

determining, with processing equipment, a second physical orientation of the second user device relative to the first user device on the surface; and selecting, with processing equipment, at least one docking function from a plurality of docking functions based on a combination of both the physical orientation and the second physical orientation.

2. The method of claim 1, wherein the physical orientation is determined to be at least one physical orientation selected from the group consisting of a translational position on the surface, a rotational position about an axis, a face direction, or any combination thereof.

3. The method of claim 1, wherein the at least one docking function comprises at least one docking function selected from the group consisting of inductively charging the user device, synchronizing data between the user device and another device, transferring data between the user device and another device, performing a diagnostic evaluation of the user device, or any combination thereof.

4. The method of claim 1, wherein the at least one docking function comprises synchronizing data between the first user device and the second user device.

5. The method of claim 1, further comprising determining the physical orientation of the second user device on the surface.

6. The method of claim 1, further comprising providing an indication as to the selected at least one docking function, wherein the indication is selected from the group consisting of an audio sound, a graphic displayed on a display screen, an electronic message notification, a vibration of the user device, or any combination thereof.

7. The method of claim 1, wherein the selecting at least one docking function from a plurality of docking functions is further based on user preference information.

8. The method of claim 1, wherein selecting, with processing equipment, at least one docking function from a plurality of docking functions based on a combination of both the physical orientation and the second physical orientation comprises:

determining whether the second physical orientation permits a docking function that involves both the user device and the second user device;

if so, selecting at least one docking function from the plurality of docking functions, wherein at least one of the selected docking functions involve both the user device and the second user device; and if not, selecting at least one docking function from the plurality of docking functions wherein, none of the selected docking functions involve both the user device and the second user device.

9. A docking apparatus comprising:
a surface configured to receive first and second user devices that have been placed on the surface; and
processing equipment configured to:
    process both a physical orientation of the first user device and a second physical orientation of the second user devices relative to the first user device to determine at least one docking function of a plurality of docking functions to perform when the first and second user devices are docked to the docking apparatus.

10. The docking apparatus of claim 9, wherein the surface is further configured to inductively charge the at least one of the first and second user devices when the at least one of the first and second user devices have been placed on the surface, and wherein the processing equipment is further configured to provide a charging signal to the surface.

11. The docking apparatus of claim 9, wherein the docking apparatus further comprises at least one communications interface configured to communicatively couple to at least one host device.

12. The docking apparatus of claim 9, wherein some or all of the physical orientation information is received from at least one sensor, wherein the at least one sensor is selected from the group consisting of an accelerometer, an inductive load sensor, a touch sensor, an optical sensor, or any combination thereof.

13. The docking apparatus of claim 9, wherein the physical orientation information comprises information stored in memory of the docking apparatus.

14. The docking apparatus of claim 9, wherein at least one of the first and second user devices comprise memory hardware and is configured to communicatively couple to the docking apparatus, and wherein the physical orientation information comprises information stored in memory hardware of the at least one of the first and second user devices.

15. The docking apparatus of claim 9, wherein the surface is partitioned into at least two lesser surfaces, and wherein physical orientation information comprises information as to which of the at least two lesser surfaces at least one of the first and second user devices has been placed onto.

16. The docking apparatus of claim 9, wherein the first and second user devices comprise one or more devices selected from the group consisting of a smart phone, a tablet computer, a personal media player, a digital camera, a personal digital assistant, a global positioning device, or any combination thereof.

17. A user device comprising:
at least one sensor configured to sense a physical orientation of the user device when the user device is placed on a surface; and
processing equipment configured to:
    determine that the user device has been placed on the surface;
    determine that a second user device has been placed on the surface;
    determine a physical orientation of the user device on the surface;
    determine a second physical orientation of the second user device relative to the first user device on the surface; and
    process both the physical orientation and the second physical orientation to determine at least one docking function of a plurality of docking functions to perform when the user device is on the surface.

18. The user device of claim 17, further comprising at least one communications interface configured to communicatively couple to at least one host device.

19. The user device of claim 17, further comprising a first communications interface, and wherein the surface is a surface of a docking apparatus comprising a second communications interface, and wherein the first communications interface is configured to communicatively couple to the second communications interface.

20. The user device of claim 17, further comprising memory coupled to the processing equipment, wherein at least some of the physical orientation information is stored in the memory.

* * * * *